United States Patent Office 2,862,734
Patented Dec. 2, 1958

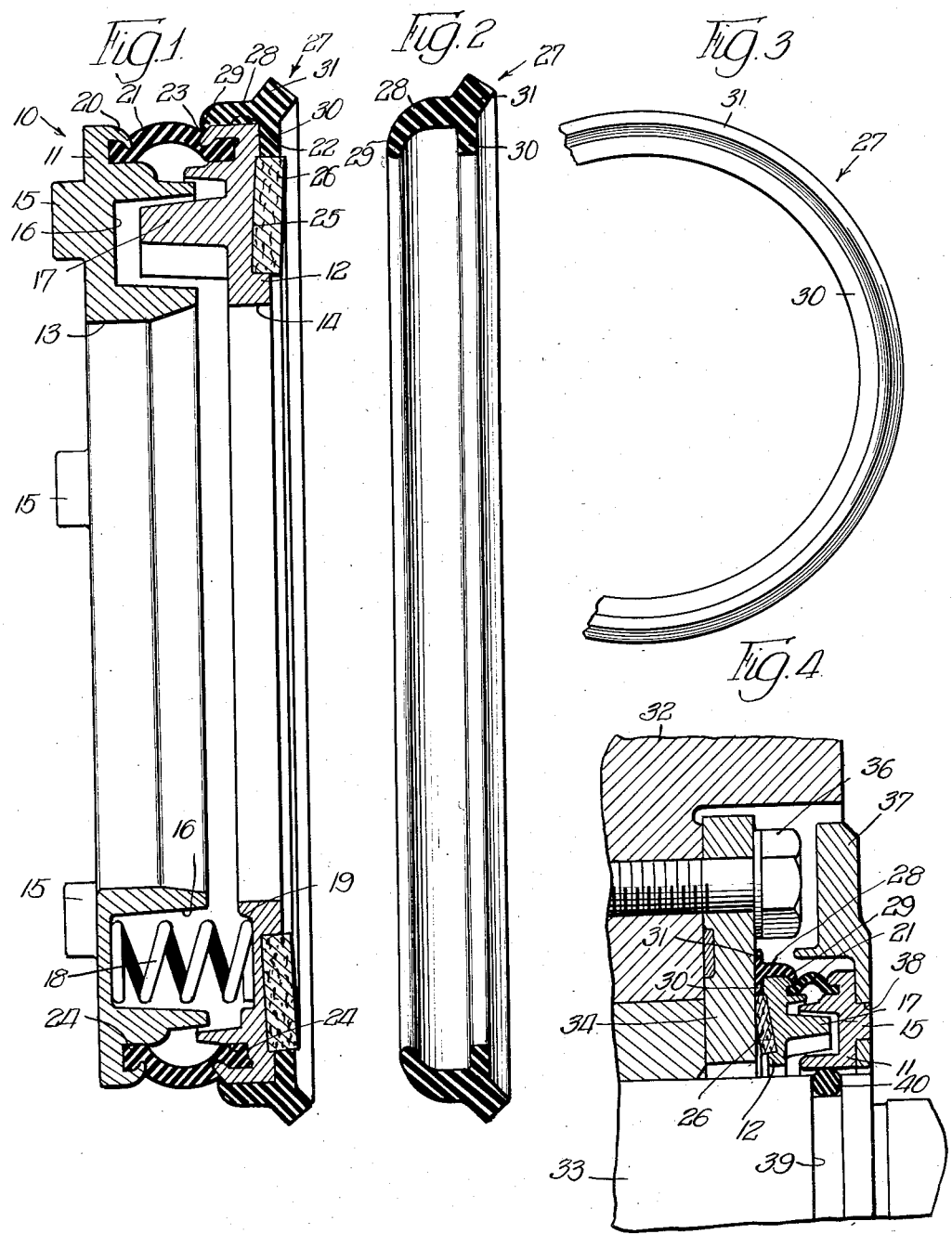
Dec. 2, 1958     H. L. NORTHUP     2,862,734
AUXILIARY SEAL
Filed June 26, 1956
INVENTOR.
Harry L. Northup,
BY
Cromwell, Greist + Warden

2,862,734

AUXILIARY SEAL

Harry L. Northup, Chicago, Ill., assignor to Chicago Rawhide Manufacturing Company, Chicago, Ill., a corporation of Illinois Application June 26, 1956, Serial No. 593,900

7 Claims. (Cl. 286—11)

The present invention is directed to a new and improved auxiliary seal in the form of an annular gasket for use with an end-face sealing unit which utilizes relatively movable mounting rings, one of which carries an end-face sealing ring for contact with a radial surface associated with a rotatable shaft about which the sealing unit is mounted. More specifically, the present invention deals with the improved functioning of an end-face seal of the type described wherein an auxiliary seal is utilized to provide efficient and tight sealing action during initial use of the end-face sealing unit until such time that the end-face sealing ring carried by the unit is sufficiently broken in to provide extended tight and efficient sealing action.

In end-face sealing units of the type generally used in providing a seal between a rotatable shaft and a radial surface, the radial surface being either rotatable relative to the sealing unit or fixed while the sealing unit rotates relative thereto, the end-face sealing rings utilized are preferably formed from wear-resistant material, such as high grade leather, to provide the end-face sealing unit with efficient sealing action over extended periods of operation. It has been found that in the use of high grade leather rings of this nature or other materials which exhibit properties similar to leather, the initial sealing action of the ring is not always complete until the relatively hard and smooth surface of the ring becomes sufficiently worn to provide increased frictional engagement with the surface under seal. During the initial period of operation the loss in sealing efficiency continues until the end-face sealing ring is broken in to the particular sealing function it is intended to perform. To provide efficient sealing action during the initial breaking-in period of an end-face seal of this type, it is considered desirable to provide auxiliary sealing means which do not require a breaking-in period and which serve as a temporary sealing means until the main end-face sealing ring is sufficiently worn to provide the sealing action desired.

It is an object of the present invention to provide a new and improved auxiliary seal in the form of a low cost gasket made from flexible, relatively soft sealing material which does not require frictional wear during first use to supply liquid-tight sealing action, the auxiliary seal being so designed and arranged to supply an end-face sealing unit with the requisite liquid-tight sealing action while the main, relatively harder end-face sealing ring is being frictionally worn during the breaking-in period so as to ultimately take over the sealing function to provide long-life, liquid-tight sealing action.

Another object is to provide a low cost auxiliary sealing gasket of a new and improved nature which is adapted to be easily and readily applied to an end-face sealing unit in association with the end-face sealing ring to provide the unit with initial fluid-tight sealing action while at the same time allowing the main sealing ring to become frictionally worn to an extent that it is capable of providing long-life, fluid-tight sealing action, the auxiliary gasket being in the form of a snap-on gasket of low cost flexible material which is sufficiently soft to frictionally engage a radial surface to be sealed and provide immediate fluid-tight sealing action.

A further object is to provide an improved end-face sealing unit capable of providing efficient sealing action between a rotatable shaft and an associated radial surface, the improved unit including a primary end-face sealing ring of highly durable, tough sealing material of the type that requires a breaking-in period in order to provide extended efficient sealing action, the primary sealing ring having associated therewith an inexpensive and uncomplicated, readily applied auxiliary sealing gasket which cooperates with the sealing unit and the primary sealing ring to provide initial liquid-tight sealing action while simultaneously allowing the primary sealing ring to become broken in, the auxiliary gasket being so designed and arranged as to be effective solely during the initial breaking-in period of the primary sealing ring and incapable of interfering with the subsequent extended sealing function of the primary sealing ring during continued use of the unit.

Other objects not specifically set forth will become apparent from the following detailed description made in conjunction with the drawings wherein:

Fig. 1 is a vertical section of an end-face sealing unit of the type adapted to be improved by the use of the auxiliary seal of the present invention, this auxiliary seal being shown operatively mounted on the unit;

Fig. 2 is a vertical section of the auxiliary seal of the present invention;

Fig. 3 is a fragmentary front elevation on reduced scale of the auxiliary seal of Fig. 2; and Fig. 4 is a fragmentary section on reduced scale of the end-face sealing unit of Fig. 1 mounted in its operative position in sealing a rotatable shaft relative to a radial surface.

Referring to Fig. 1, an end-face seal unit 10 is shown as being formed from cooperating ring members 11 and 12. The ring member 11 is provided with an axial annular opening 13 and the member 12 is provided with an aligned annular opening 14, these openings receiving a shaft therethrough as will be subsequently described. The rear face of the member 11 is provided with a plurality of circumferentially spaced lugs 15 and the front face of this member is provided with a series of circumferentially spaced recesses 16. Some of the recesses 16 receive rearwardly directed lugs 17 carried on the rear face of the ring member 12 while others receive coil springs 18 having their outer ends seated in shallow, circumferentially spaced indentations 19 carried on the rear face of the mounting ring 12.

The outer periphery of the ring member 11 is provided with a forwardly and inwardly directed diaphragm locking edge 20 which is embedded in a flexible annular diaphragm 21 inwardly of an end margin thereof. The mounting member 12 is provided with a flat, axially extending outer surface 22, the rearmost edge of which is provided with an inwardly and downwardly rolled rib 23 embedded in the diaphragm 21 near the front edge thereof. Each of the rings 11 and 12 is provided with annular grooves 24 opening toward one another which receive therein the edge margins of the annular diaphragm 21 in its clamped condition. The front radial face of the ring member 12 is provided with an annular groove 25 of substantial radial width which receives therein an end-face sealing ring 26. The ring 26 is suitably secured in the groove 25 against displacement therefrom.

The end-face sealing unit 10 is designed to function in the known manner in that the flexible diaphragm 21 allows the mounting rings 11 and 12 to move relative to one another in an axial direction and the lugs 17 prevent relative rotation between the members 11 and 12 as well as radial displacement. The springs 18 resiliently urge the members 11 and 12 away from one another and disassociation between these members is eliminated by the interconnected flexible diaphragm 21. Consequently, the unit 10 is adapted for sealing engagement between relatively movable parts and the springs 18 constantly bias the sealing ring 26 into sealing engagement with a radial surface under seal.

The sealing ring 26 is preferably formed from dense and relatively hard material, such as high grade leather, and, when manufactured, the outermost sealing face of the ring is provided with a smooth unroughened surface. Consequently, upon initial use of the unit 10, the smooth, hard sealing face of the ring 26 is incapable of developing sufficient sealing friction with a surface under seal. With continued use, the abrasive forces acting on the sealing face of the ring 26 will ultimately roughen the surface to an extent that frictional sealing forces increase and the sealing efficiency of the ring 26 also increases. In order to obtain fluid-tight sealing efficiency upon initially placing the unit 10 into operation, an auxiliary seal in the form of a gasket 27 is carried by the outer surface of the mounting ring 12. The gasket 27 is preferably formed from flexible, relatively soft material, such as natural or synthetic rubber, to provide the requisite frictional sealing action when the unit 10 is first placed into operation until the ring 26 is broken in so as to be capable of providing continuous fluid-tight sealing action.

The auxiliary seal 27 is generally Y-shaped in cross section and is formed from an axially extending annular neck portion 28 to the rearmost axial end of which is integrally formed an inturned circumferentially continuous lip 29. The front axial end of the neck portion 28 has integrally formed therewith a radially inwardly directed lip 30 which is circumferentially continuous and which is of slightly greater radial length than the lip 29. Outwardly of the lip 30 is a block-like sealing lip 31 integrally formed therewith and with the forward end of the neck portion 28. The lip 31 is of greater thickness and mass than the lips 29 and 30. The lip 31 is further circumferentially continuous and is directed forwardly and outwardly in a radial direction relative to the neck portion 28 and lips 29 and 30.

As shown in Fig. 1, the gasket 27 is applied to the mounting ring 12 so that the neck portion 28 intimately grips the outer axially extending surface 22 thereof. The lip 29 folds over the rearmost radial edge of the surface 22 in contact with the outer radial surface of the rib 23 and the lip 30 is received about the front face of the ring 12 inwardly of the outer periphery thereof a substantial distance. The gasket 27, being preferably formed from stretchable material such as rubber, is flexed slightly to be received about the outer surface of the ring member 12. Consequently, the gasket is tightly received thereabout and the lips 29 and 30 cooperate to retain the gasket properly mounted on the ring member 12 in snapped-on relation. The sealing lip 31 is proportioned to extend forwardly beyond the front sealing face of the ring 26 so as to be brought into contact with a radial surface under seal and substantially flexed or compressed in sealing engagement therewith as will subsequently be described.

Referring to Fig. 4, a typical application of the unit 10 is illustrated in connection with its use in tractor-type machinery using continuous tracks to move the same operated by track rollers. A track roller 32 is illustrated as being fixed to a shaft 33 and being rotated by the shaft in a known manner. A radial face portion of the roller 32 carries a thrust plate 34 suitably fixed thereto by a bolt 36. Closely associated with the thrust plate 34 is a fixed housing 37 which, in association with the shaft 33, carries the end-face sealing unit 10. The housing 37 is provided with lug-receiving recesses 38 receiving the lugs 15 therein to fix the unit 10 against rotation with the shaft 33. The ring member 12 is compressed against the thrust plate 34 by action of the springs 18 and the end-face sealing action occurs between the ring 26 and the thrust plate 34. The shaft 33 is provided with a circumferential groove 39 which receives therein a rubber O-ring 40 in sealing engagement with the inner surface 13 of the ring member 11. Upon rotation of the shaft 33 and the track roller 32, a fluid-tight seal is maintained between the O-ring 40 and the surface 13 and an end-face sealing action is maintained between the ring 26 and the radial outer surface of the thrust plate 34.

Upon the mounting of the unit 10 in its operative position, the sealing lip 31 is compressibly flexed toward coplanar relation with the lip 30 and ring 26. This feature provides a relatively soft efficient sealing surface of substantial radial width in compressive sealing engagement with the radial surface of the thrust plate 34. Consequently, upon rotation of the shaft 33, a fluid-tight efficient end-face sealing action is immediately obtained. The ring 26 is carried by the mounting ring 12 at a slight inclination to the vertical to promote slanting wear of the same thereby extending the life of efficient operation of the unit 10. The gasket 27 is adequate to maintain efficient fluid-tight sealing action until the surface of the ring 26 in frictional contact with the thrust plate 34 becomes sufficiently broken in to provide adequate frictional sealing action. This occurs as soon as the relative smooth hard outer surface of the ring is sufficiently worn. The relatively soft material of the gasket 27 is provided with adequate toughness to maintain proper sealing action during the breaking-in period of the ring 26. The sealing lip 31 during this period becomes worn but does not become completely ineffective until well after the full sealing effect of the ring 26 has been obtained.

From the foregoing description it will be noted that the auxiliary seal in the form of the gasket 27 is of uncomplicated design and readily adapted for low cost manufacture. A relatively small amount of material is necessary to provide the auxiliary sealing function. The gasket 27 may be readily inserted in its operative position on the unit 10 and is capable of being efficiently retained thereon during its use. As a result of the utilization of the gasket 27 with the unit 10, oil leakage will not occur upon initial operation of the machinery. The breaking-in period normally necessary upon the use of end-face seals of this nature will occur without an accompanying loss in sealing efficiency.

While the frictional engagement of the gasket 27 to the mounting ring 12 is adequate for the purpose described, it should be understood that, if desired, cooperating serrations on the inner surface of the gasket and the surface 22 may be used to prevent turning of the gasket relative to the ring.

Obviously many modifications and variations of the invention as hereinbefore set forth may be made without departing from the spirit and scope thereof, and therefore only such limitations should be imposed as are indicated in the appended claims.

I claim:

1. An auxiliary seal in the form of a snap-on gasket for use with an end-face seal, said auxiliary seal including an annular axially extending neck portion, the innermost axial end of which is provided with a radially inturned integral first lip adapted to be received about a radial rear edge of an end-face seal mounting member, the outermost axial end of said neck portion having integrally formed therewith a radially inwardly directed annular second lip adapted to be received against the front radial edge of said end-face seal mounting member, and a radially outwardly directed annular sealing lip positioned above said second lip and extending axially outwardly beyond said second lip, said first and second lips both being radially inwardly directed in cooperating relation to hold said auxiliary seal in its operative position relative to said end-face seal.

2. An auxiliary seal in the form of a snap-on gasket for use with an end-face seal, said auxiliary seal including an annular axially extending neck portion, the innermost axial end of which is provided with a radially inturned integral first lip adapted to be received about a radial rear edge of an end-face seal mounting member, the outermost axial end of said neck portion having integrally formed therewith a radially inwardly directed annular second lip adapted to be received against the front radial edge of said end-face seal mounting member, and a radially outwardly directed annular sealing lip positioned above said second lip and extending axially outwardly beyond said second lip, said first and second lips both being radially inwardly directed in cooperating relation to hold said auxiliary seal in its operative position relative to said end-face seal, said sealing lip being compressibly flexible toward coplanar relation with said second lip and said end-face seal when in use.

3. An auxiliary seal in the form of a snap-on gasket for use with an end-face seal, said auxiliary seal including an annular axially extending neck portion, the innermost axial end of which is provided with a radially inturned integral first lip adapted to be received about a radial rear edge of an end-face seal mounting member, the outermost axial end of said neck portion having integrally formed therewith a radially inwardly directed annular second lip adapted to be received against the front radial edge of said end-face seal mounting member, and a radially outwardly directed sealing lip positioned above said second lip and extending axially outwardly beyond said second lip, said sealing lip extending away from said outermost axial end and said second lip in a forwardly and outwardly angular relation, said first and second lips both being radially inwardly directed in cooperating relation to hold said auxiliary seal in its operative position relative to said end-face seal.

4. An expansible and compressible end-face seal for providing sealing action between a rotatable shaft and a radial surface, said seal including annular mounting members fixed against relative rotation and interconnected by an annular flexible diaphragm for limited axial relative movement, one of said mounting members having a radially outer axially extending annular surface which is axially terminated by front and rear radially inwardly directed faces, an end-face sealing ring carried by said front face radially inwardly of the outer edge thereof for sealing engagement with said radial surface, and an auxiliary annular sealing gasket received about the axially extending surface of said last named mounting member and having radially inwardly directed edge portions in gripping contact with said front and rear radial faces, said gasket being further provided with an annular flexible sealing lip directed forwardly and radially outwardly from said front face and extending axially beyond said sealing ring.

5. An expansible and compressible end-face seal for providing sealing action between a rotatable shaft and a radial surface, said seal including annular mounting members fixed against relative rotation and interconnected by an annular flexible diaphragm for limited axial relative movement, means for moving said mounting members toward full expansion as limited by said diaphragm, one of said mounting members having a radially outer axially extending annular surface which is axially terminated by front and rear radially inwardly directed faces, an end-face sealing ring carried by said front face radially inwardly of the outer edge thereof for sealing engagement with said radial surface, and an auxiliary annular sealing gasket received about the axially extending surface of said last named mounting member and having radially inwardly directed edge portions in gripping contact with said front and rear radial faces, said gasket being further provided with an annular flexible sealing lip directed forwardly and radially outwardly from said front face and extending axially beyond said sealing ring, said gasket being retained by said mounting member solely by frictional engagement of said edge portions with said faces.

6. An expansible and compressible end-face seal for providing sealing action between a rotatable shaft and a radial surface, said seal including annular mounting members fixed against relative rotation and interconnected by an annular flexible diaphragm for limited axial relative movement, means for moving said mounting members toward full expansion as limited by said diaphragm, one of said mounting members having a radially outer axially extending annular surface which is axially terminated by front and rear radially inwardly directed faces, an end-face sealing ring carried by said front face radially inwardly of the outer edge thereof for sealing engagement with said radial surface, and an auxiliary annular sealing gasket received about the axially extending surface of said last named mounting member and having radially inwardly directed edge portions in gripping contact with said front and rear radial faces, said gasket being further provided with an annular flexible sealing lip directed forwardly and radially outwardly from said front face and extending axially beyond said sealing ring, said sealing lip being adapted to flex toward coplanar relation with said sealing ring when said seal is in use.

7. In an expansible and compressible end-face seal adapted for providing sealing action between a rotatable shaft and a radial surface, the seal including annular mounting members fixed against relative rotation and interconnected by an annular flexible diaphragm for axial relative movement, means for moving said mounting members toward full expansion as limited by said diaphragm, one of the mounting members having a radially outer axially extending annular surface which is axially terminated by front and rear radially inwardly directed faces, and said last named member carrying an end-face sealing ring along the front face thereof radially inwardly of the outer edge for sealing engagement with said radial surface, the provision of an auxiliary annular sealing gasket received about the axially extending surface of said last named mounting member and having radially inwardly directed edge portions in contact with said front and rear radial faces, said gasket being further provided with an annular flexible sealing lip directed forwardly and radially outwardly from said front face and extending axially beyond said sealing ring.

References Cited in the file of this patent

UNITED STATES PATENTS

| 2,100,220 | King | Nov. 23, 1937 |
| 2,301,723 | Vedovell | Nov. 10, 1942 |
| 2,615,739 | Vedovell | Oct. 28, 1952 |
| 2,757,947 | Whitten | Aug. 7, 1956 |

FOREIGN PATENTS

| 1,087,490 | France | Aug. 25, 1954 |